United States Patent [19]
Hahn

[11] Patent Number: 6,027,828
[45] Date of Patent: *Feb. 22, 2000

[54] MODULAR STACKABLE BATTERY PACK AND ACCESSORIES

[75] Inventor: Stan S. Hahn, Moraga, Calif.

[73] Assignee: Advanced Mobile Solutions, Inc., Moraga, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/951,616

[22] Filed: Oct. 16, 1997

[51] Int. Cl.[7] ...................................................... H01M 2/10
[52] U.S. Cl. .............................. 429/100; 429/96; 429/91; 429/99
[58] Field of Search ............................... 429/100, 99, 96, 429/91

[56] References Cited

U.S. PATENT DOCUMENTS 5,635,814  6/1997  Afzal et al. ........................ 429/100 X Primary Examiner—John S. Maples
Attorney, Agent, or Firm—Crosby, Heafey, Roach & May; Nathan P. Koenig

[57] ABSTRACT

A modular, stackable battery pack and electronic accessory system which allows one or more batteries to simultaneously power one or more electronic accessories. The battery packs and accessories each have two opposing faces which are configured to releasable mate with each other and to provide electrical connection between the components. In some embodiments, the accessory is configured to be one of the terminal ends of the system, and thus has only one face with a releasable connector. The other face may be reserved for operation of the accessory. In other embodiments, the battery packs themselves may also comprise an electronic accessory. Accessories suitable in the practice of this invention include a cellular telephone, a PDA, a pager, a personal stereo (AM/FM radio or cassette, DAT or CD player), a calculator, an alarm clock, an electronic address book, a shaver, a solar powered battery pack recharger, a voice memo recorder, a tazer or a flashlight.

11 Claims, 3 Drawing Sheets

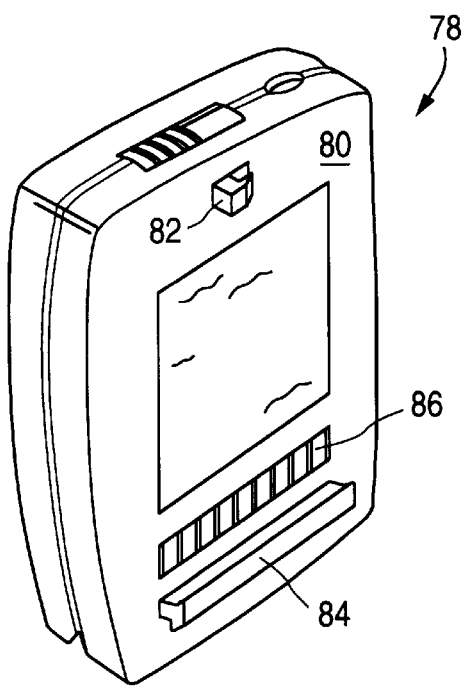
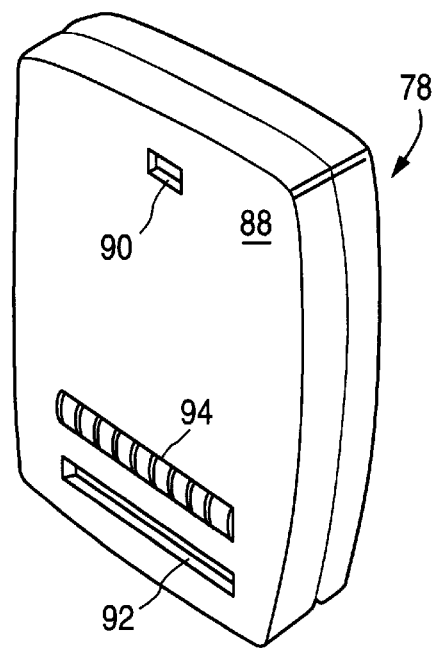
FIG. 5A   FIG. 5B
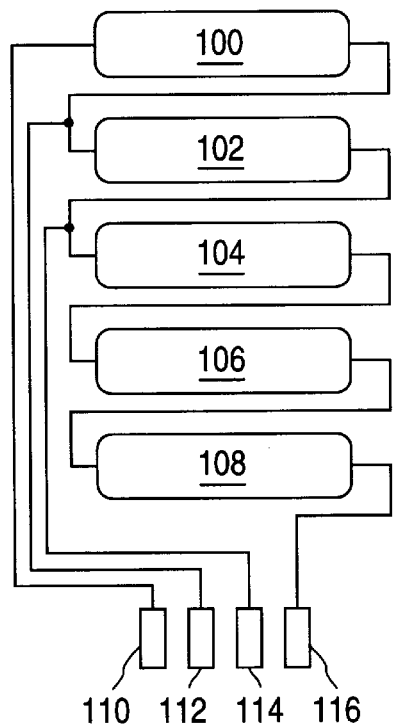
FIG. 6

MODULAR STACKABLE BATTERY PACK AND ACCESSORIES

FIELD OF THE INVENTION

This invention relates to portable personal electronics, particularly to a universal battery pack that may be used to power a variety of accessories, including cellular telephones, personal stereos, memo recorders and the like.

BACKGROUND OF THE INVENTION

In recent years, advances in miniaturization have generated a great variety of personal electronic devices. Indeed, many people have come to depend on cellular telephones, electronic address books, personal digital assistants (PDA's) and pagers for their day to day professional lives. Likewise, consumer electronics such as personal stereos and hand-held video games are common recreational devices.

A feature common to all these personal electronic is the need for some type of energy storage to supply power. Particularly with high drain devices such as cellular telephones, it is often necessary to carry multiple batteries and perhaps a charging station for even relatively short trips. The user must constantly track the remaining battery capacity for each device to ensure that the charge will hold for a desired length of time. Alternatively, the user must carry spare batteries. Since each electronic device typically has its own requirements and form factors, the user might be forced to carry several different spare batteries to power the various devices. It is also quite desirable to provide these personal electronic devices with rechargeable batteries, both for their relative economy and to minimize environmental impact. However, such recharging systems are rarely compatible. One device's charger often will not recharge another's battery, nor will that battery be usable with a different device.

Accordingly, there has been a need for a system to integrate the power supplies of multiple personal electronic devices. There has also been a need for a universal rechargeable battery which can be used to power a variety of devices. This invention satisfies these and other needs.

SUMMARY OF THE INVENTION

The modular stackable battery pack of this invention comprises one or more battery housings, each having a first face and a second face which are generally opposing with a releasable connector and a first set of electrical conductors on the first face and a releasable connector and a second set of electrical conductors on the second face, wherein the connector of a first face and the connector of a second face are configured to releasably mate with each other and bring the electrical conductors of the first face into alignment and contact with the electrical conductors of the second face, and a rechargeable battery contained within the battery housing and connected to the electrical conductors. This configuration allows more than one battery to be stacked together serially to supply power to the desired accessories. In additional embodiments, an electrical accessory is provided that has a housing with a first face having a first releasable connector and a first set of electrical conductors. The accessory first releasable connector is configured to mate with a releasable connector on the battery pack and to bring the first set of electrical conductors on the accessory housing into alignment and contact with electrical conductors on the battery pack. Preferably, the accessory housing also has a second face with a second releasable connector and a second set of electrical conductors. The second face is configured to mate with the first face, and to bring the second set of electrical conductors into alignment and contact with the first set of electrical conductors. This allows more than one accessory configured in this manner to be serially connected to the system. Optionally, a battery pack unit of the invention may also incorporate additional accessories into the battery pack housing, such as a battery capacity indicator, an AM-FM radio, a voice memo recorder and the like.

In yet another embodiment of the invention, the modular stackable battery pack and accessory system further comprises a non-electronic accessory that generally comprises a housing having a first face and a releasable connector configured to mate with the battery pack-accessory stack. Thus, even though the accessory does not require power from the battery pack-accessory stack, it may be releasably secured to the stack for convenience.

BRIEF DESCRIPTION OF THE DRAWINGS

FIGS. 5a and 5b illustrate an accessory module embodying features of the invention.

FIG. 6 is a schematic diagram showing one wiring configuration that allows the accessories of the invention to access multiple voltages.

DETAILED DESCRIPTION OF THE PREFERRED EMBODIMENT

Figure 1A:
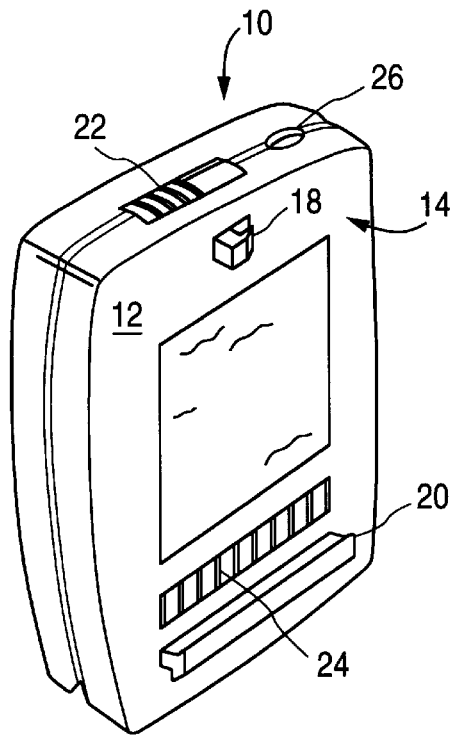
FIGS. 1a and 1b are isometric views of the two faces of a battery pack of the invention.
Figure 1B:
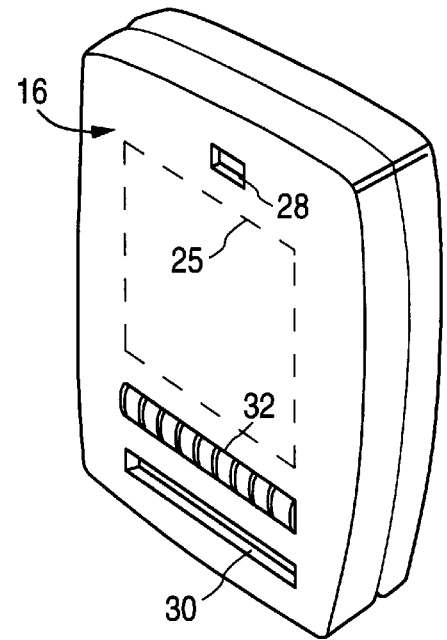

FIG. 1 is an illustration of a battery pack 10 of the invention. As shown in FIGS. 1a and 1b, the battery pack 10 generally comprises a housing 12 having two generally opposing faces 14 and 16. Face 14 shown in FIG. 1a has a male connector that comprises releasable latch 18 and hook 20. Releasable latch 18 is connected to actuator 22 so that sliding the actuator releases that latch. A first set of electrical conductors 24 is connected to a rechargeable battery or batteries 25 contained within housing 12. Preferably, battery pack 10 further comprises a battery capacity indicator 26. FIG. 1b illustrates face 16 which has a connector that comprises socket 28 and channel 30. Socket 28 and channel 30 are configured to receive latch 18 and hook 20, respectively. Other suitable configurations for releasable connectors include magnets, hook-and-loop fasteners and snap-lock fittings. Face 16 further comprises a second set of electrical conductors 32 which are also connected to the battery pack or to the accessory. When a male connector face 14 is mated with a female connector face 16, electrical conductors 24 and 32 are brought into alignment and contact. In some embodiments, the electrical conductors may comprise friction fitting plug systems that also comprise the releasable connectors.

The battery cells preferably comprise nickel metal hydride (NiMH) batteries, but lithium, nickel-cadmium or other chemistries may be suitable. One or more stacked battery packs 10 may be recharged at once with a single charger. In a preferred embodiment, the charger will supply voltage to allow any accessories that are attached to the battery pack to be used. In another embodiment, the charger is configured to use automotive DC voltage via cigarette lighter connection. In other embodiments, it may be desirable to provide a solar powered battery charger.

Figure 2:
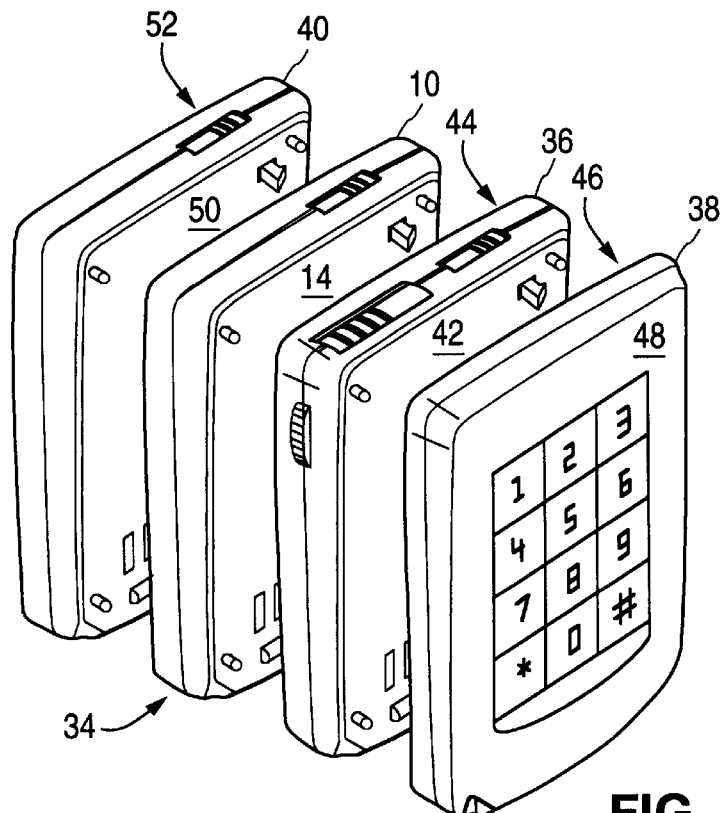
FIG. 2 is an exploded view of a battery pack-accessory stack of the invention, comprising a cellular telephone, a battery pack and two other accessories.

FIG. 2 shows a battery pack-accessory stack 34 of the invention, comprising a battery pack 10, an AM/FM personal stereo accessory module 36, a cellular telephone module 38, and another accessory module 40. AM/FM module 36, has a connector face 42, corresponding in form to battery pack face 14, and a connector face 44, corresponding to face 16. Cellular telephone module 38 comprises a terminal module, and thus has only one connector face, connector face 46, reserving face 48 for use of the module. Preferably, in this embodiment, face 48 comprises a charged capacitance device (CCD) touch sensitive screen for input and display. Accessory module 40 has a connector face 50 having a conformation corresponding to face 14 and face 52 may either comprise another releasable connector or not. Module 40 may also comprise a second battery pack.

Figure 3:
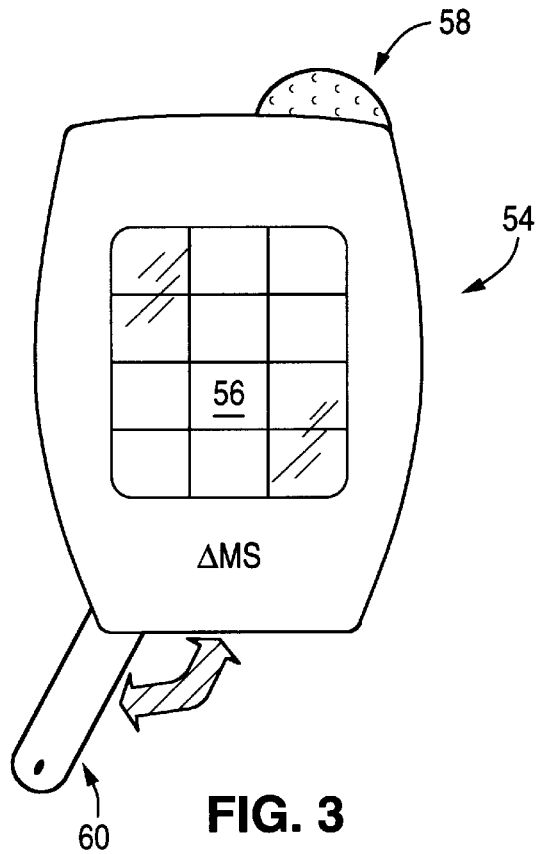
FIG. 3 is a view of a conventional cellular telephone accessory of the invention.
Figures 4A, 4B:
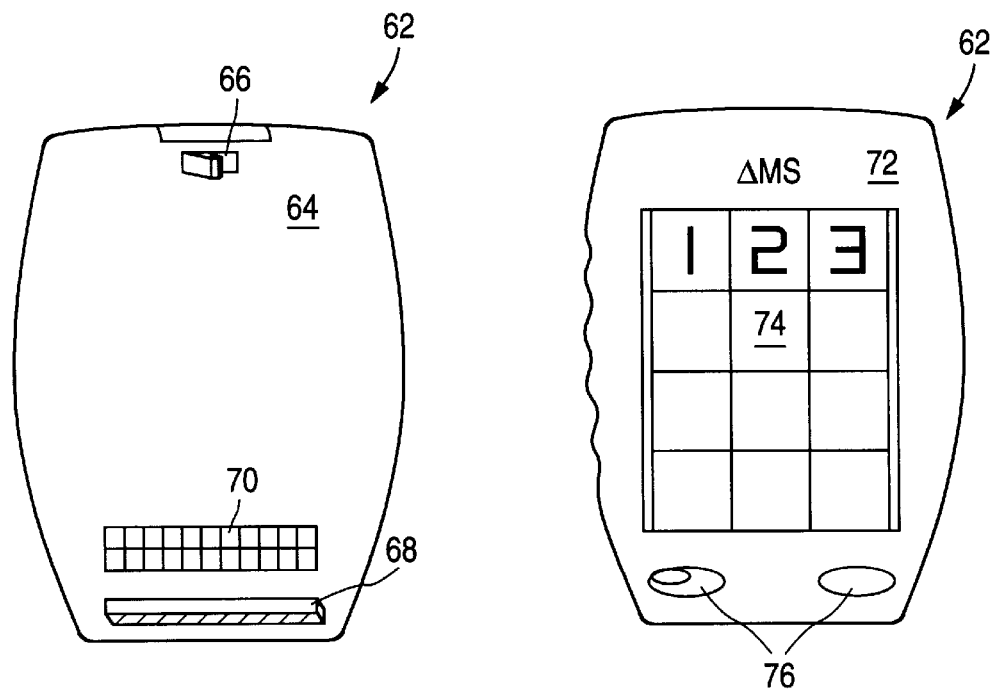
FIGS. 4a and 4b are isometric views of the two faces of a cellular telephone with wireless headset, comprising elements of the invention.

FIG. 3 shows a detail of a cellular telephone accessory module 54 of the invention, comprising touch screen 56, speaker 58 and a swing-out microphone 60. Alternatively, FIGS. 4a and 4b show a cellular telephone accessory module 62 adapted for hands free use. As shown in FIG. 4a, face 64 comprises a releasable connector with releasable latch 66, hook 68 and electrical conductors 70. FIG. 4b shows face 72 which primarily comprises touch screen 74 and operation buttons 76. Cellular telephone 62 also comprises a transceiver for communicating with a hands-free headset (not shown).

FIGS. 5a and 5b illustrate accessory module 78, which comprises a releasable connector face 80, corresponding in form to battery pack face 14, having latch 82, hook 84 and electrical conductors 86, and a releasable connector face 88, corresponding to face 16, having socket 90, channel 92 and electrical conductors 94. Depending on the application, electrical conductors may connect to accessory module as necessary to provide the desired voltage, may pass through to allow connection of additional modules, or may provide a means to communicate with additional modules, such as sending information from a pager module to an electronic address book module.

Suitable accessories for the modular stackable battery pack and accessory system include any portable electronic device, such as a cellular telephone, a PDA, a pager, a personal stereo (AM/FM radio or cassette, DAT or CD player), a calculator, an alarm clock, an electronic address book, a shaver, a solar powered battery pack recharger, a voice memo recorder, a tazer or a flashlight. Alternatively, the accessory module could be a non-electronic device such as a utility knife, a cosmetics compact, a business card holder, or other container. In such embodiments, the module will have male and/or female connector faces. Electrical conductors with pass through connections are preferable if the module is configured to be used in the middle of the battery pack-accessory stack, but are not necessary if the module is configured to be used at the end of the stack.

Preferably, the rechargeable battery of the battery pack 10 comprises an array of cells such as 51.2 volt cells, so that a variety of voltages may be accessed depending on which subset of conductors is used in an given circuit. For example, as shown in FIG. 6, 5 battery cells 100, 102, 104, 106, and 108 are wired to four conductors 110, 112, 114, and 116 so as to serially connect the five cells in combinations giving five different voltages. Thus, in embodiments where each cell is 1.2 volts, conductors 110 and 112 provide 1.2 volts, conductors 110 and 114 provide 2.4 volts (two cells in serial), conductors 114 and 116 provide 3.6 volts (three cells in serial), conductors 112 and 116 provide 4.8 volts (four cells in serial), and conductors 110 and 116 provide 6.0 volts (all five cells in serial). Preferably, when multiple battery packs 10 are mated with each other, the conductors are configured to connect the batteries in parallel to increase the energy supply of the battery pack system without altering the base voltages. In certain embodiments of the invention, additional conductors may be supplied which provide a pass-through connection between faces 14 and 16 of battery pack 10 or between to allow communication between the various accessories in the battery pack-accessory stack.

A general description of the device of the present invention as well as a preferred embodiment of the present invention has been set forth above. One skilled in the art will recognize and be able to practice many changes in many aspects of the device described above, including variations that fall within the teachings of this invention. The spirit and scope of the invention should be limited only as set forth in the claims which follow.

What is claimed is:

1. A modular stackable battery pack comprising:
 a first battery housing having a first face and a second face which are generally opposing;
 a first face configuration comprising a releasable connector and electrical conductors, wherein the first face has the first face configuration;
 a second face configuration comprising a releasable connector and electrical conductors, wherein the second face has the second face configuration; and
 a rechargeable battery contained within the battery housing and connected to the electrical conductors of the first face and the electrical conductors of the second face;

wherein the first face configuration can releasably mate with a device having the second face configuration to bring the electrical conductors of the first face configuration into electrical contact with the electrical conductors of the second face configuration and wherein the second face configuration can releasably mate with a device having the first face configuration to bring the electrical conductors of the second face configuration into electrical contact with the electrical conductors of the first face configuration.

2. The modular stackable battery pack of claim 1 further comprising a battery capacity indicator.

3. The modular stackable battery pack of claim 1 wherein the battery housing further comprising an integrated electronic accessory.

4. The modular stackable battery pack of claim 3, wherein the integrated accessory is selected from the group consisting of a pager, a voice memo recorder and a radio.

5. A modular stackable battery pack and accessory system comprising:
 a) a battery pack comprising:
  i) a battery housing having a first face and a second face which are generally opposing;
  ii) a first face configuration comprising a releasable connector and electrical conductors, wherein the first face has the first face configuration;
  iii) a second face configuration comprising a releasable connector and electrical conductors, wherein the second face has the second face configuration; and
  iv) a rechargeable battery contained within the battery housing and connected to the electrical conductors of the first face and the electrical conductors of the second face;

wherein the first face configuration can releasably mate with a device having the second face configuration to bring the electrical conductors of the first face configuration into electrical contact with the electrical conductors of the second face configuration and wherein the second face configuration can releasably mate with a device having the first face configuration to bring the electrical conductors of the second face configuration into electrical contact with the electrical conductors of the first face configuration; and b) a first portable electronic accessory module comprising:
        i) a first accessory housing having a first face, wherein the first face has the first configuration with releasable connector and electrical conductors; and
        ii) an electronic accessory connected to the electrical conductors of the first face of the first accessory housing;

wherein the first face configuration of the first accessory housing can releasably mate with the second face configuration of the battery housing to bring the electrical conductors of the first face configuration of the first accessory housing into electrical contact with the electrical conductors of the second face configuration of the battery housing.

6. The modular stackable battery pack and accessory system of claim 5, wherein the first portable electronic accessory further comprises a second face generally opposing the first face, wherein the second face has the second configuration with releasable connector and electrical conductors; and further comprising a second portable electronic accessory comprising:

i) a second accessory housing having a first face, wherein the first face has the first configuration with releasable connector and electrical conductors; and
    ii) an electronic accessory connected to the electrical conductors of the first face of the second accessory housing;

wherein the first face configuration of the second accessory housing can releasably mate with the second face configuration of the first accessory housing to bring the electrical conductors of the first face configuration of the second accessory housing into electrical contact with the electrical conductors of the second face configuration of the first accessory housing.

7. The modular stackable battery pack and accessory system of claim 5, wherein the accessory module comprises a cellular telephone.

8. The modular stackable battery pack and accessory system of claim 5, wherein the accessory module is selected from the group consisting of a PDA, a pager, a personal stereo, a calculator, an alarm clock, an electronic address book, a shaver, a solar powered battery pack recharger, a voice memo recorder, a tazer and a flashlight.

9. The modular stackable battery pack and accessory system of claim 5, further comprising a second accessory module having a housing and a face configured to mate with the modular stackable battery pack and accessory system.

10. A portable electronic accessory module for use with a modular stackable battery pack and accessory system comprising:

a) an accessory housing having a first face, wherein the first face has a first face configuration with a releasable connector and electrical conductors;
    b) an electronic accessory housed by the accessory housing and connected to the electrical conductors of the first face of the accessory housing;

wherein the first face configuration can releasably mate with a battery pack having a second face configuration with a releasable connector and electrical conductors to bring the electrical conductors of the first face configuration of the accessory housing into electrical contact with the electrical conductors of the second face configuration of the battery pack; and c) a second face on the accessory housing, wherein the second face has the second face configuration with a releasable connector and electrical conductors connected to the electronic accessory; wherein the second face configuration can releasably mate with a battery pack having the first face configuration with a releasable connector and electrical conductors to bring the electrical conductors of the second face configuration of the accessory housing into electrical contact with the electrical conductors of the first face configuration of the battery pack.

11. The portable electronic accessory module of claim 10 wherein the electronic accessory is selected from the group consisting of a PDA, a pager, a personal stereo, a calculator, an alarm clock, an electronic address book, a shaver, a solar powered battery pack recharger, a voice memo recorder, a tazer and a flashlight.

* * * * *